US006428103B1

(12) United States Patent
Hong

(10) Patent No.: US 6,428,103 B1
(45) Date of Patent: Aug. 6, 2002

(54) WHEELCHAIR WITH A PIVOTING BACK, SEAT AND LEG SUPPORTS

(76) Inventor: Chin-Lien Hong, No. 21, Lane 151, Ho-Tso St., Fengyuan City, Taichung Hsien (TW)

( * ) Notice: Subject to any disclaimer, the term of this patent is extended or adjusted under 35 U.S.C. 154(b) by 0 days.

(21) Appl. No.: 09/651,848

(22) Filed: Aug. 31, 2000

(51) Int. Cl.[7] .................................................. B60N 2/02

(52) U.S. Cl. .................. 297/354.13; 297/330; 297/340; 297/DIG. 4

(58) Field of Search ........................... 297/DIG. 4, 316, 297/340, 330, 354.13, DIG. 10, 83; 280/250.1, 304.1, 210

(56) References Cited

U.S. PATENT DOCUMENTS 2,320,614 A * 6/1943 Kleine
2,682,913 A * 7/1954 Scheide
4,691,964 A * 9/1987 Morgan
5,044,647 A * 9/1991 Patterson

* cited by examiner

*Primary Examiner*—Milton Nelson, Jr.
(74) *Attorney, Agent, or Firm*—Hedman & Costigan, P.C.

(57) ABSTRACT

A wheelchair has a base with a pair of wheels connected to each side of the base, a seat pivotally connected to the base, a backrest pivotally connected to the seat and a transmitting mechanism for pivoting the seat and the backrest. The transmitting mechanism includes a seat bracket secured to the seat, a seat shaft received in the seat bracket, a front gear and a rear respectively mounted on two end of the seat shaft, a main shaft slidably received in the base and extending into the seat bracket, a back shaft securely connected with the backrest and extending into the seat bracket, a back gear mounted on the back shaft and engaging with the rear gear, a seat gear and a main gear mounted on the main shaft and engaging with the front gear alternately. By such an arrangement, the seat and the backrest can be pivoted to an upright position or horizontal position to assist a disabled person to stand up or lie on the wheelchair.

8 Claims, 7 Drawing Sheets

WHEELCHAIR WITH A PIVOTING BACK, SEAT AND LEG SUPPORTS

BACKGROUND OF THE INVENTION

1. Field of the Invention

The present invention relates to a wheelchair, and more particularly to a wheelchair with a pivoting back, seat and leg supports to assist a disabled person stand up or lie down on the wheelchair.

2. Description of Related Art

The wheelchair is used to carry a disabled person. The wheelchair in accordance with the prior art comprises a base, two wheels mounted on each side of the base, a seat secured to the base and a backrest secured to the seat. However, the seat and backrest of the conventional wheelchair are fixed and their positions cannot be changed. Therefore, if the disabled person wants to get out of the wheelchair, assistance from another person is needed.

To overcome the shortcomings, the present invention tends to provide an improved wheelchair to mitigate or obviate the aforementioned problems.

SUMMARY OF THE INVENTION

The main objective of the invention is to provide an improved wheelchair comprising a base with two wheels mounted on each side, a seat pivotally connected to the base, a backrest pivotally connected to the seat and a transmitting mechanism for pivoting the seat and backrest individually or simultaneously. The transmitting mechanism comprises a seat bracket, a seat shaft, a front gear and a rear, a main shaft, a seat gear, a back shaft, a back gear and an control device. The seat shaft is received in the seat bracket. The front and rear gear are mounted on opposite ends of the seat shaft. The main shaft is slidably received in the base. The seat gear is mounted on the main shaft and engages the front gear in addition to being detachably connected to the seat bracket. The back shaft is securely connected to the backrest. The back gear is mounted on the back shaft and engages the rear gear. The control device moves the main shaft horizontally to alternate the engagement of the front gear and the seat gear in addition to the seat gear and the seat bracket. Consequently, the seat and the backrest can be pivoted to an upright position or horizontal position so as to assist a disable person to stand up or lie on the wheelchair.

Other objectives, advantages and novel features of the invention will become more apparent from the following detailed description when taken in conjunction with the accompanying drawings.

DETAILED DESCRIPTION OF PREFERRED EMBODIMENT

Figure 1:
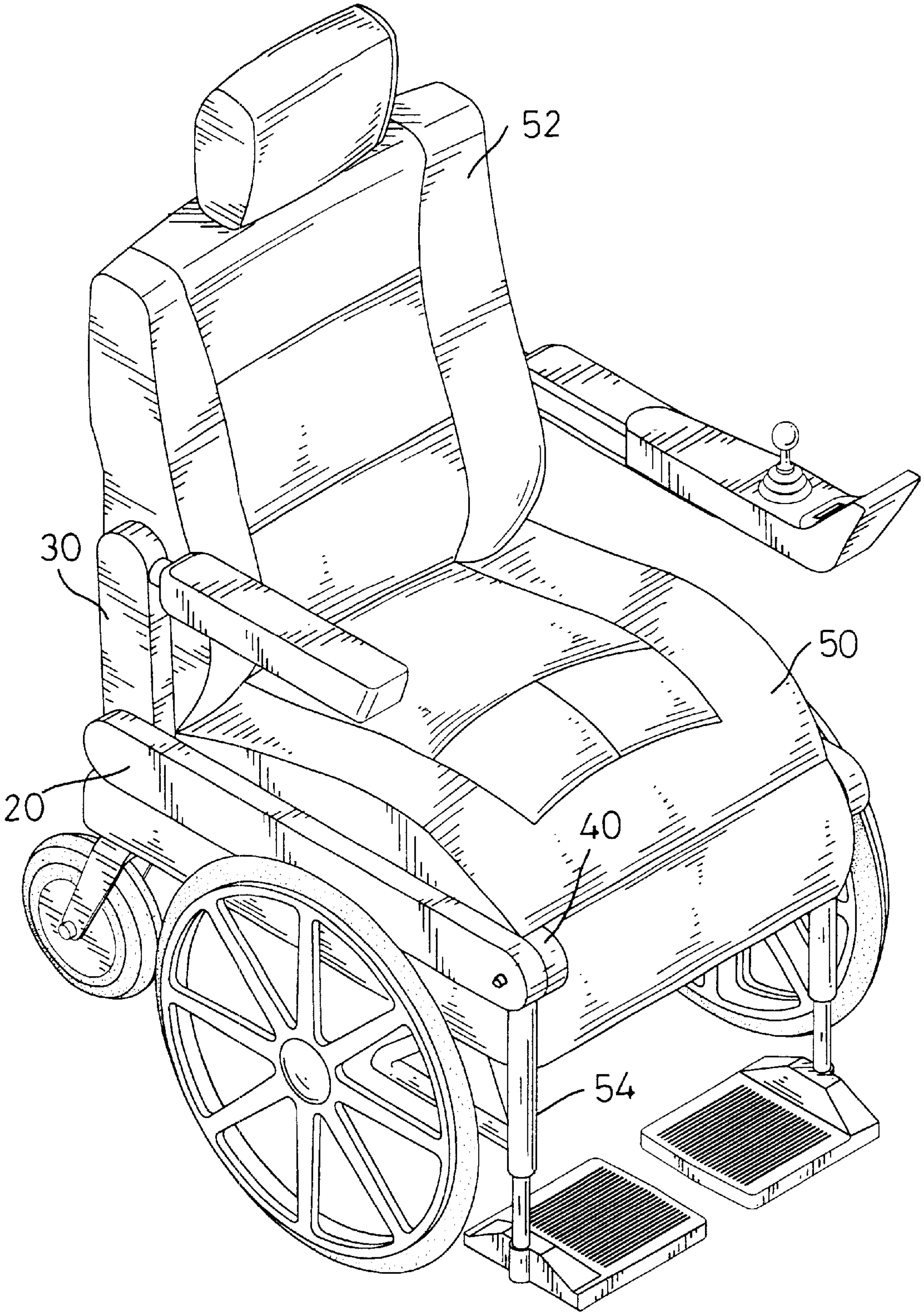
FIG. 1 is a perspective view of the wheelchair in accordance with the present invention.
Figure 2:
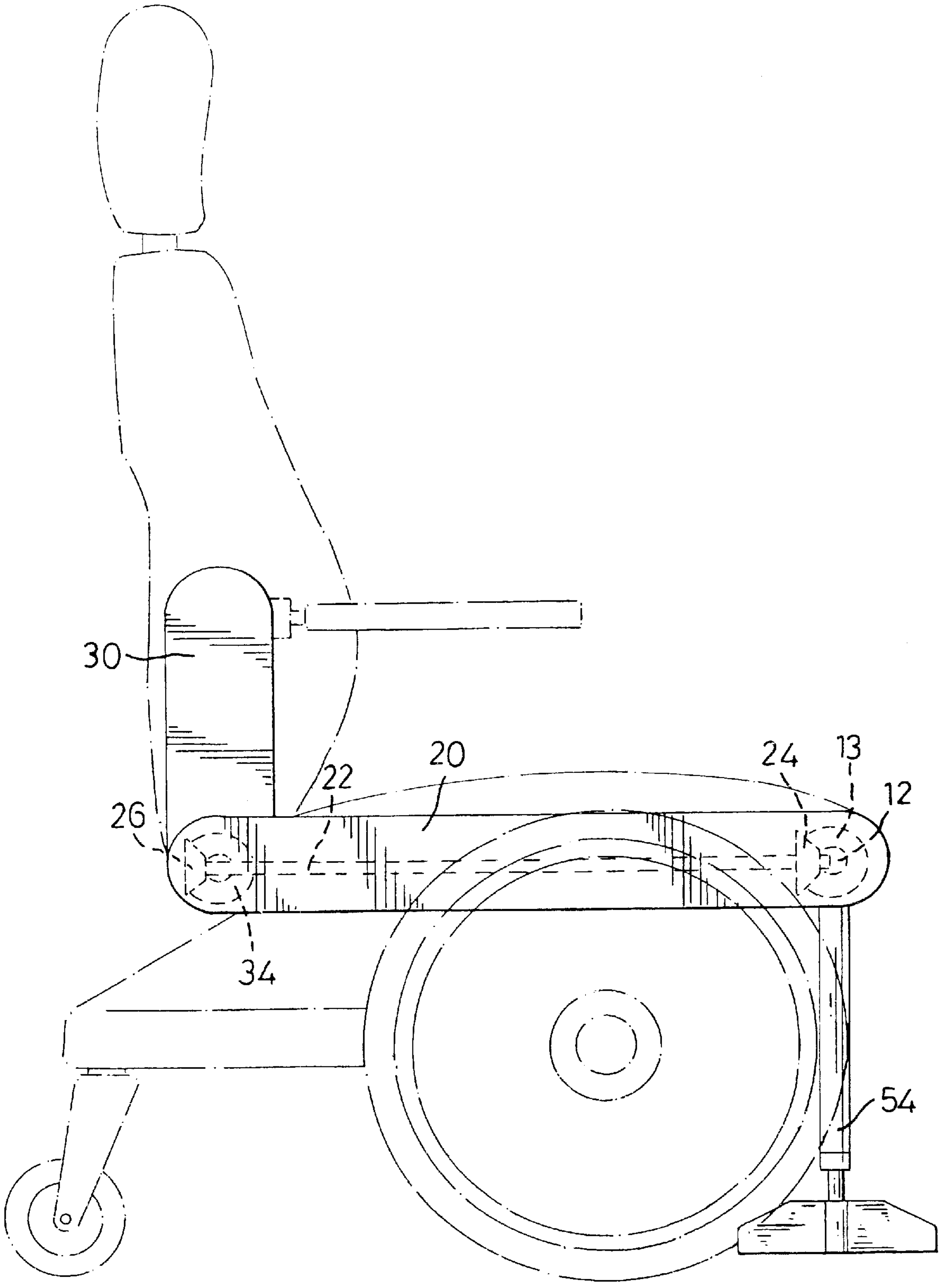
FIG. 2 is a side plan view of the wheelchair in FIG. 1.

With reference to FIG. 1, a wheelchair in accordance with the present invention comprises a base, a seat (50), a backrest (52) and a transmitting mechanism. The base has a pair of wheels rotatably mounted on each side. The seat (50) is pivotally mounted on the base. The backrest (52) is pivotally connected to the seat (50). The transmitting mechanism is positioned to pivot the seat (50) and the backrest (52) relative to the base.

With reference to FIGS. 1–4, the transmitting mechanism in accordance with the present invention includes a seat bracket (20), a seat shaft (22), a main shaft (12), a back shaft (32), a motor (10) and a control device (18). The seat bracket (20) is secured to one side of the seat (50). The seat shaft (22) is rotatably received in the seat bracket (20). A front gear (24) and a rear gear (26) are mounted on the seat shaft (22) at the front edge of the seat(10) and the junction of the seat (10) and the backrest (52) respectively. The main shaft (12) is laterally and slidably mounted in the base on the front end with one end extending into the seat bracket (20). A main gear (13) and a seat gear (16) are mounted on the end of the main shaft (12) in the seat bracket (20) and alternately engage with the front gear (24) on the seat shaft (22). A hole (202) is defined in the seat bracket (20). A stub (162) is mounted on the seat gear (16) and extends into the hole (202) when the seat gear (16) engages with the front gear (24). The back shaft (32) is secured to the backrest (52) and has one end extending into the seat bracket (20). A back gear (34) is mounted on the back shaft (32) and engages with the rear gear (26). In addition, a back bracket (30) is mounted on each side of the backrest and secured to the back shaft (32). The motor (10) is used to rotate the main shaft (12).

The control device (18) is used to move the main shaft (12) laterally relative to the base so as to control the engagement of the front gear (24) between the main gear (12) and the seat gear (16). The control device (18) includes a pushing rod (182) and an actuating device for pivotally rotating the pushing rod (182). The actuating device can be a motor with a linking lever assembly or a hydraulic jack. A recess (122) to receive the pushing rod (182) is defined in the main shaft (12). When the pushing rod (182) pivotally moves, the main shaft (12) will move laterally relative to the base due to the engagement between the pushing rod (182) and recess (122). Consequently, the engagements of the front gear (24) between the main gear (13) and seat gear (16) can be changed. In addition, a biasing member (17) is mounted on the end of the main shaft (12) and abuts the seat gear (16). The biasing member (17) provides a biasing force to the seat gear (16) to assist the seat gear (16) to engage with the front gear (24).

Figure 3:
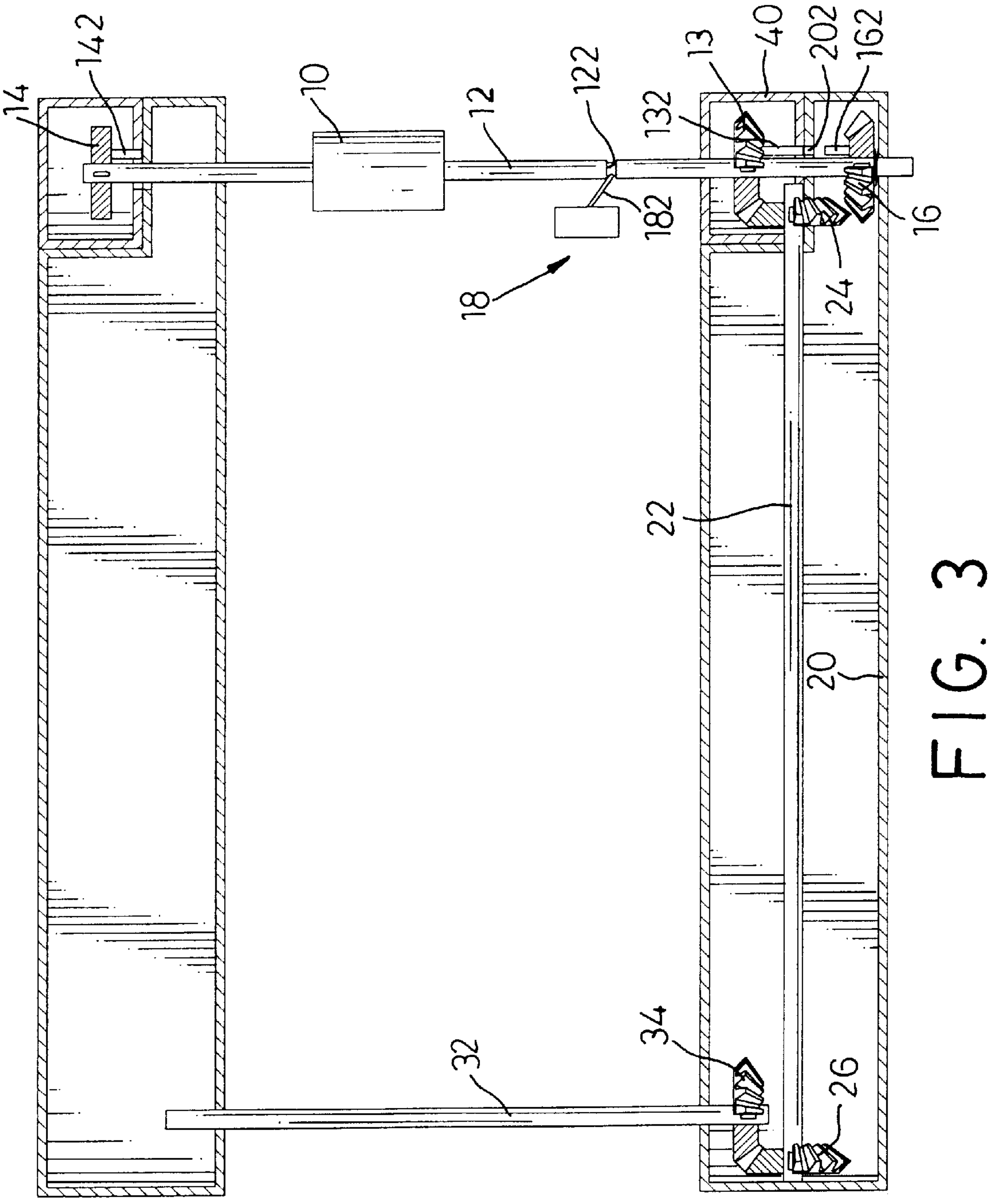
FIG. 3 is a top plan view of the transmitting mechanism of the wheelchair in FIG. 1.
Figure 4:
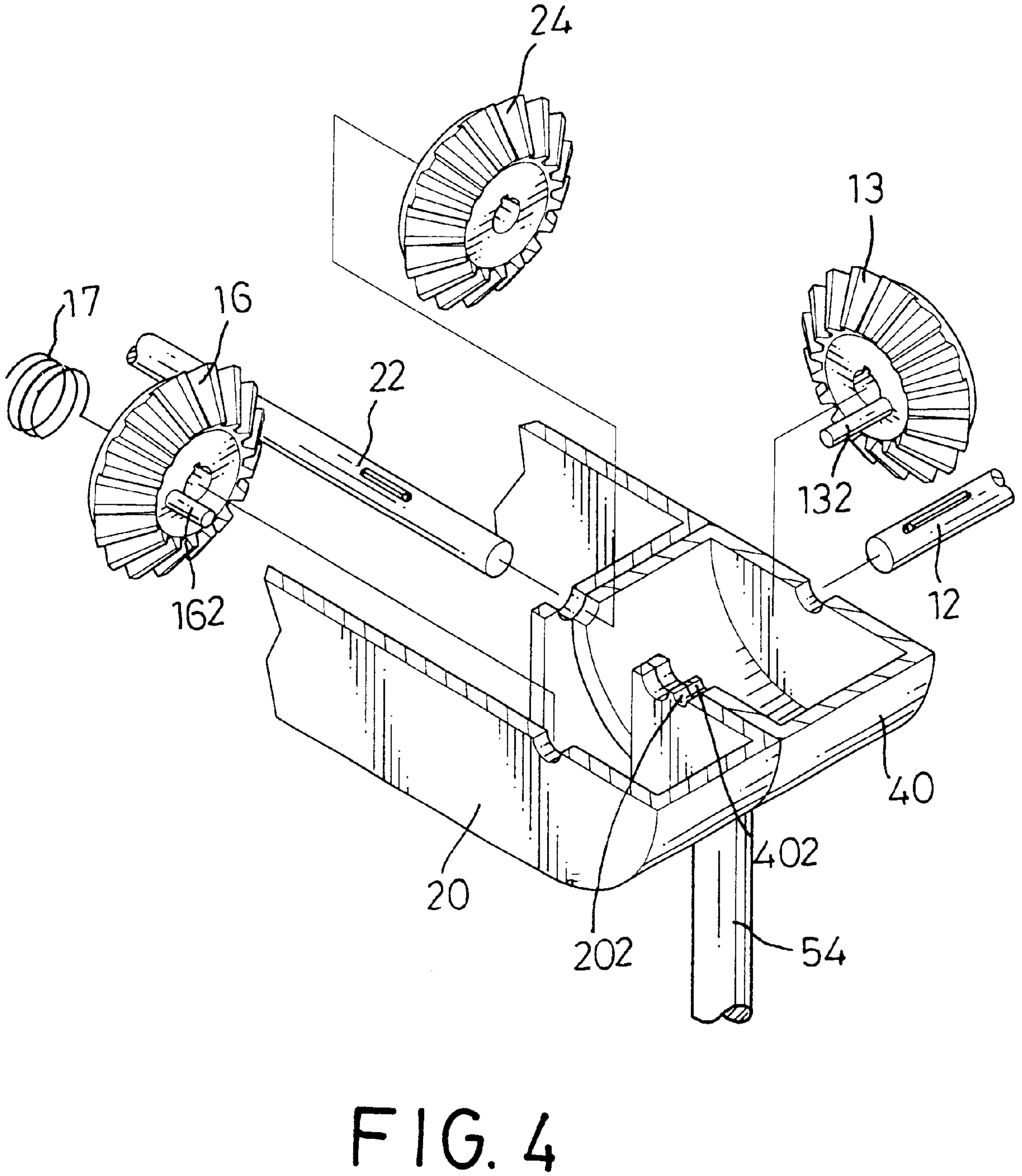
FIG. 4 is an enlarged exploded perspective view of the transmitting mechanism in FIG. 3.
Figure 5:
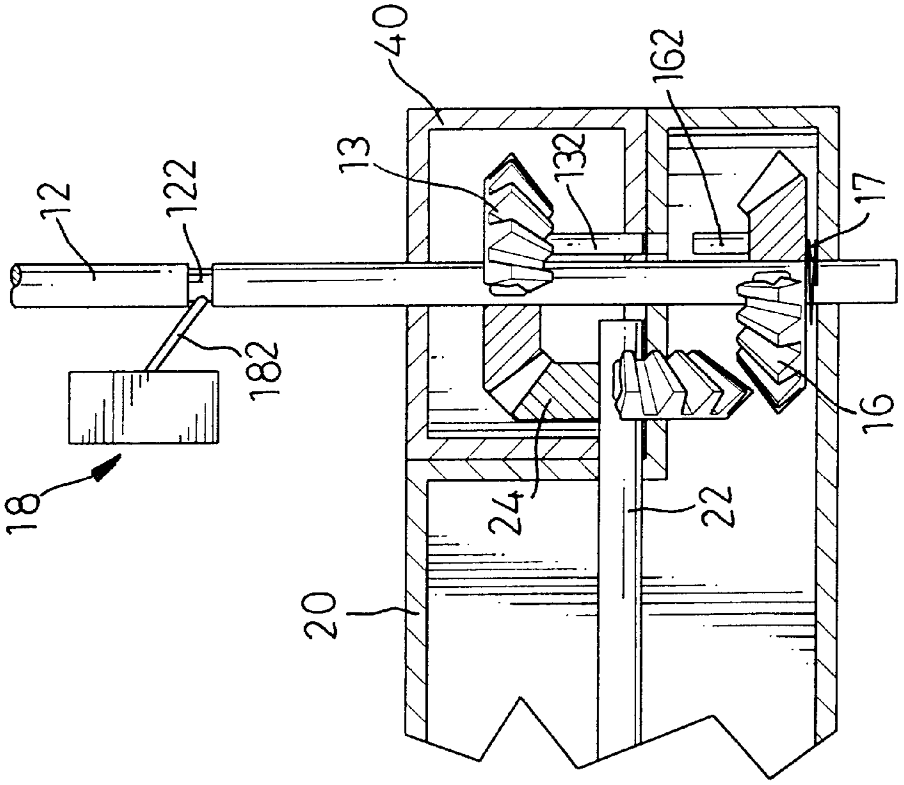
FIG. 5 is a top plan view in partial section of the transmitting mechanism in FIG. 3 showing the main gear engaged with the front gear.
Figure 6:
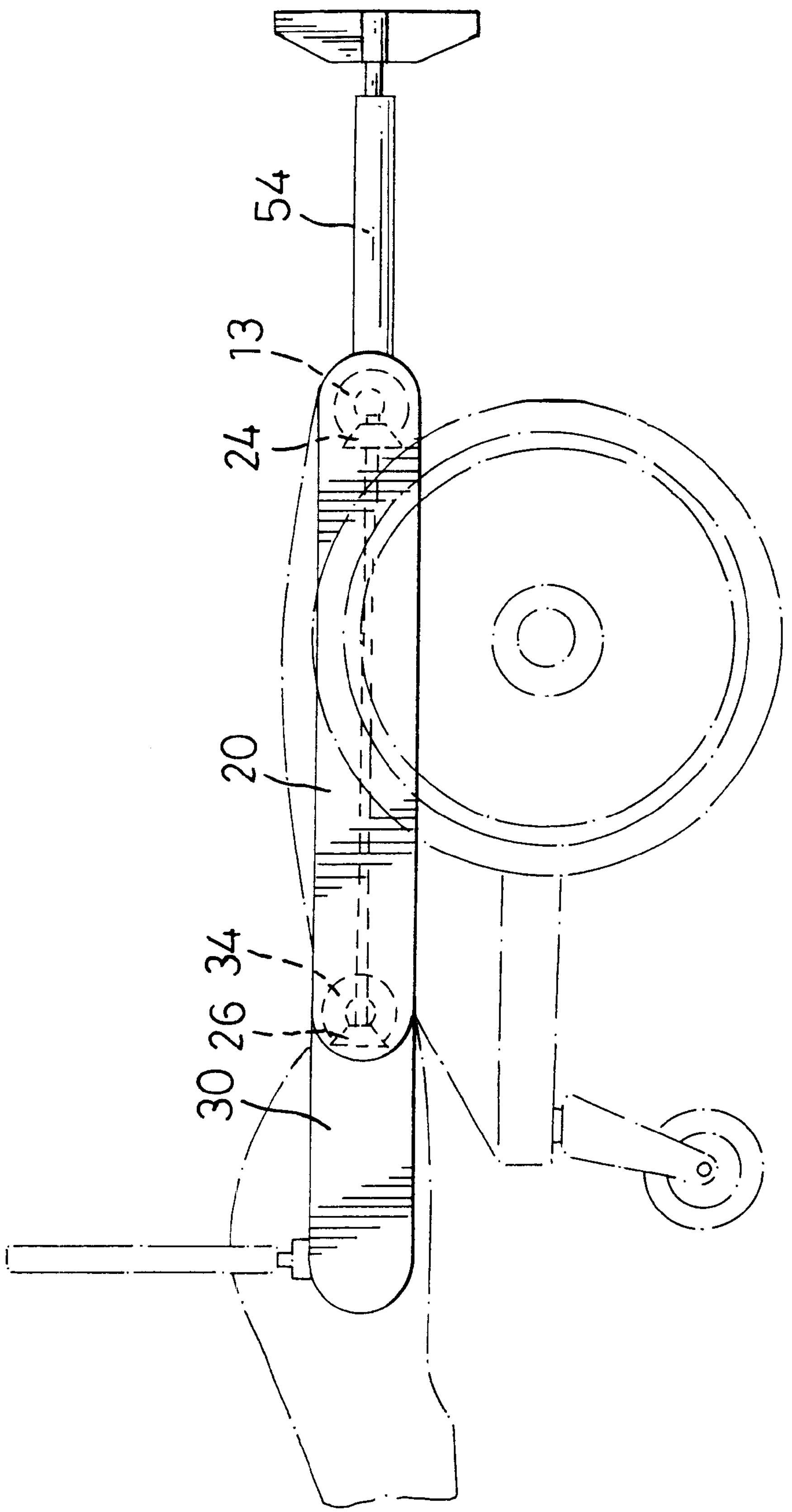
FIG. 6 is a side plan view of the wheelchair in FIG. 1 showing the backrest pivoted to a horizontal position.

With reference to FIGS. 3 and 5–6, when a disabled person sitting in the wheelchair wants to lie on the wheelchair, the control device (18) moves the main shaft (12) to a position where the main gear (13) engages with the front gear (24) and the seat gear (16) disengages from the front gear (24). The motor (10) then rotates the main shaft (12). The seat shaft (22) will rotate due to the engagement between the main gear (13) and front gear (24), and the back shaft (32) will rotate due to the engagement between the rear gear (26) and the back gear (34). The backrest (52) securely connected to the back shaft (32) will rotate relative to the seat (50) to become parallel with the seat (50). Consequently, the disable person can lie on the lateral seat (50) and backrest (52) of the wheelchair.

When the motor (10) rotates inversely, the backrest (52) will rotate to the original position perpendicular to the seat (50) due the transmission of the transmitting mechanism, such that the disabled person can sit in the wheelchair.

Figure 7:
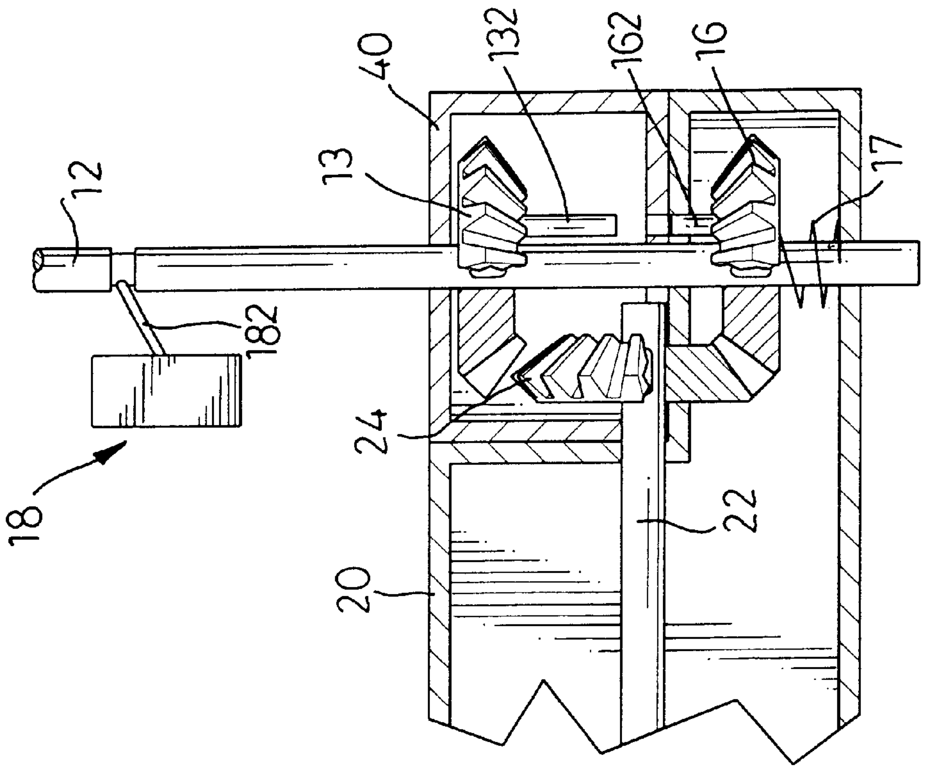
FIG. 7 is a top plan view in partial section of the transmitting mechanism in FIG. 3 showing the seat gear engaged with the front gear.
Figure 8:
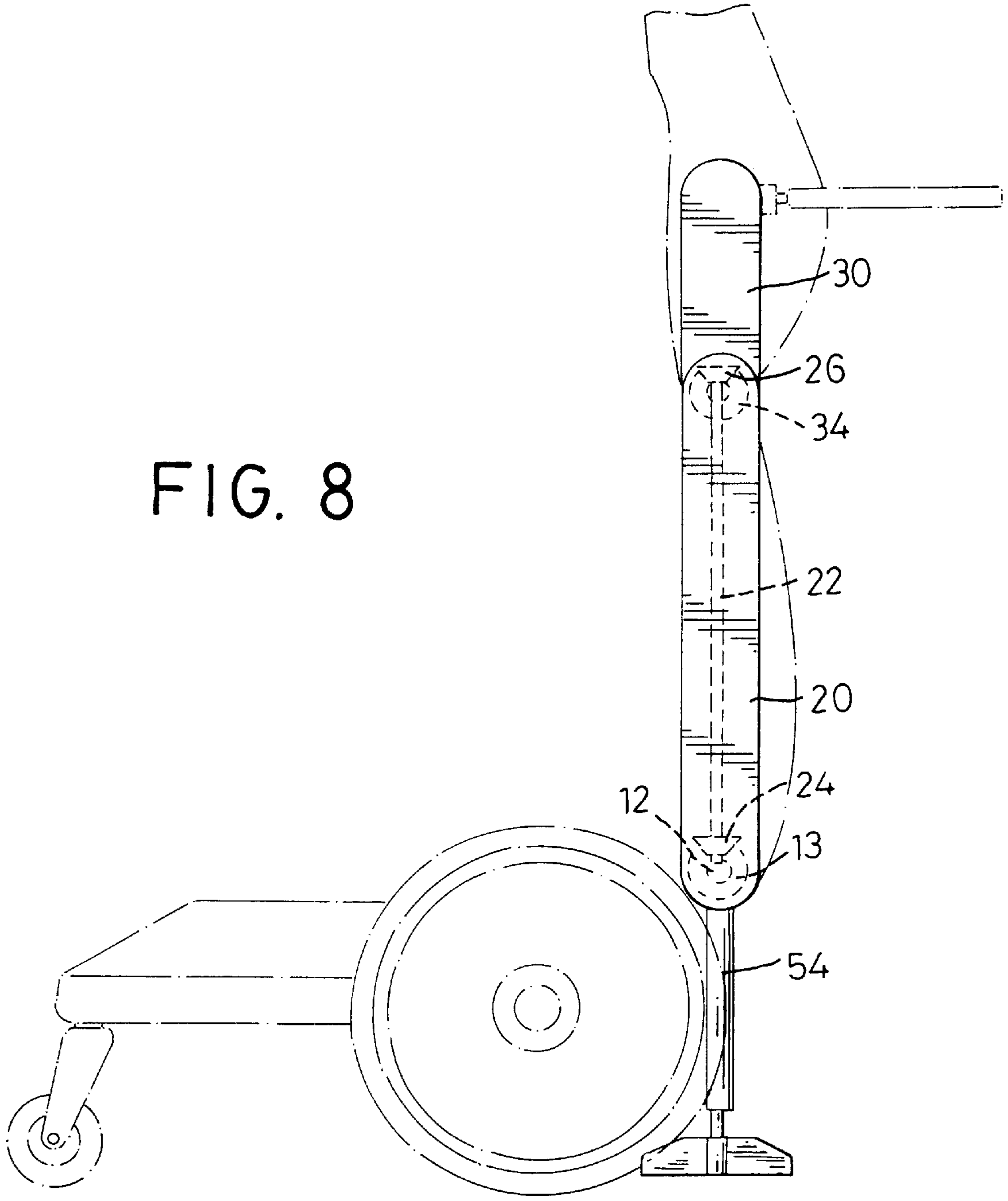
FIG. 8 is a side plan view of the wheelchair in FIG. 2 showing the backrest and the seat pivoted to an upright position.

With reference to FIGS. 3 and 7–8, when a disabled person sitting in the wheelchair wants to stand up from the wheelchair, the control device (18) moves the main shaft (12) laterally so the main gear (13) disengages from the front gear (24) and the seat gear (16) engages with the front gear (24). The stub (162) mounted on the seat gear (16) will insert into the hole (202) defined in the seat bracket (20). When the motor (10) rotates the main shaft (12), the seat bracket (20) will rotate relative to the base due to the engagement between the stub (162) and the hole (202), such that the seat (50) will be lifted to an upright position relative to the base. The seat shaft (22) will simultaneously rotate due to the engagement between the seat gear (16) and front gear (24), such that the back shaft (32) will rotate due to the engagement between the rear gear (26) and the back gear (34). The backrest (52) will rotate relative to the seat (50) parallel with the seat (50), such that the backrest (52) can also be lifted to an upright position relative to the base. Consequently, the disable person can stand up from the wheelchair without the assistance of others.

With reference to FIGS. 1–4, a leg bracket (40) is pivotally mounted on each side of the base, and each end of the main shaft (12) extends into one of the leg brackets (40). A leg support (54) is mounted on each leg bracket (40) to support each leg of the disabled person sitting in the wheelchair. The main gear (13) is received in the leg bracket (40) at one end of the main shaft (12). A flywheel (14) is mounted on the other end of the main shaft (12) and received in the other leg bracket (40). A hole (402) is defined in each leg bracket (40), and a stub (132,142) is mounted on each of the main gear (13) and flywheel (14). Each stub (132,142) will insert into the corresponding hole (402) of the leg bracket (40) when the main gear (13) engage with the front gear (24). With reference to FIGS. 3, and 5–6, when the backrest (52) is rotated to a horizontal position, each leg bracket (40) will simultaneously rotate horizontally due to the engagement between the corresponding stub (132,142) and the hole (402) to support the legs of the person lying on the wheelchair.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wheelchair comprising:

a base with a pair of wheels connected to each side of the base;

a seat pivotally connected to the base;

a backrest pivotally connected to the seat; and a transmitting mechanism for pivoting the seat and the backrest, the transmitting mechanism comprising:

a seat bracket securely mounted on one side of the seat;

a seat shaft received in the seat bracket;

a front gear and a rear gear respectively mounted on opposite ends of the seat shaft;

a main shaft slidably received in the base and having one end extending into the seat bracket;

a motor received in the base to rotate the main shaft;

a back shaft securely connected to the backrest and having one end extended into the seat bracket;

a back gear mounted on one end of the back shaft and engaging with the rear gear;

a seat gear mounted on one end of the main shaft and engaging with the front gear in addition to being detachably connected to the seat bracket; and a main gear mounted on the main shaft and engaging with the front gear;

wherein the main gear and the seat gear are alternately engaged with the front gear.

2. The wheelchair as claimed in claim 1, wherein a hole is defined in the seat bracket; and a stub is mounted on the seat gear and extends into the hole when the seat gear engages the front gear.

3. The wheelchair as claimed in claim 1, wherein a biasing member is mounted on one end of the main shaft and abuts the seat gear.

4. The wheelchair as claimed in claim 1 further comprising a back bracket mounted on each side of the backrest and securely connected with the back shaft.

5. The wheelchair as claimed in claim 1 further comprising a leg bracket pivotally mounted on each side of the base and each end of the main shaft extending into opposite leg supports;

a leg support secured to each leg bracket;

the main gear received in one of the leg brackets and detachably connected to the leg bracket receiving the main gear; and a flywheel received in the other leg bracket and detachably connected to the leg bracket receiving the flywheel.

6. The wheelchair as claimed in claim 5, wherein a hole is defined in each leg bracket; and a stub is mounted on each of the main gear and flywheel in addition to extending into the hole when the main gear engages with the front gear.

7. The wheelchair as claim in claim 1, wherein the transmitting mechanism further comprises a control device to move the main shaft horizontally to alternate the engagement of the front gear between the main gear and the seat gear.

8. The wheelchair as claimed in claim 7, wherein the control device comprises a pushing rod and an actuating device for rotating the pushing rod; and a recess to receive the pushing rod is defined in the main shaft.

* * * * *